(No Model.)
W. H. FAUBER.
VELOCIPEDE.
No. 492,959. Patented Mar. 7, 1893.
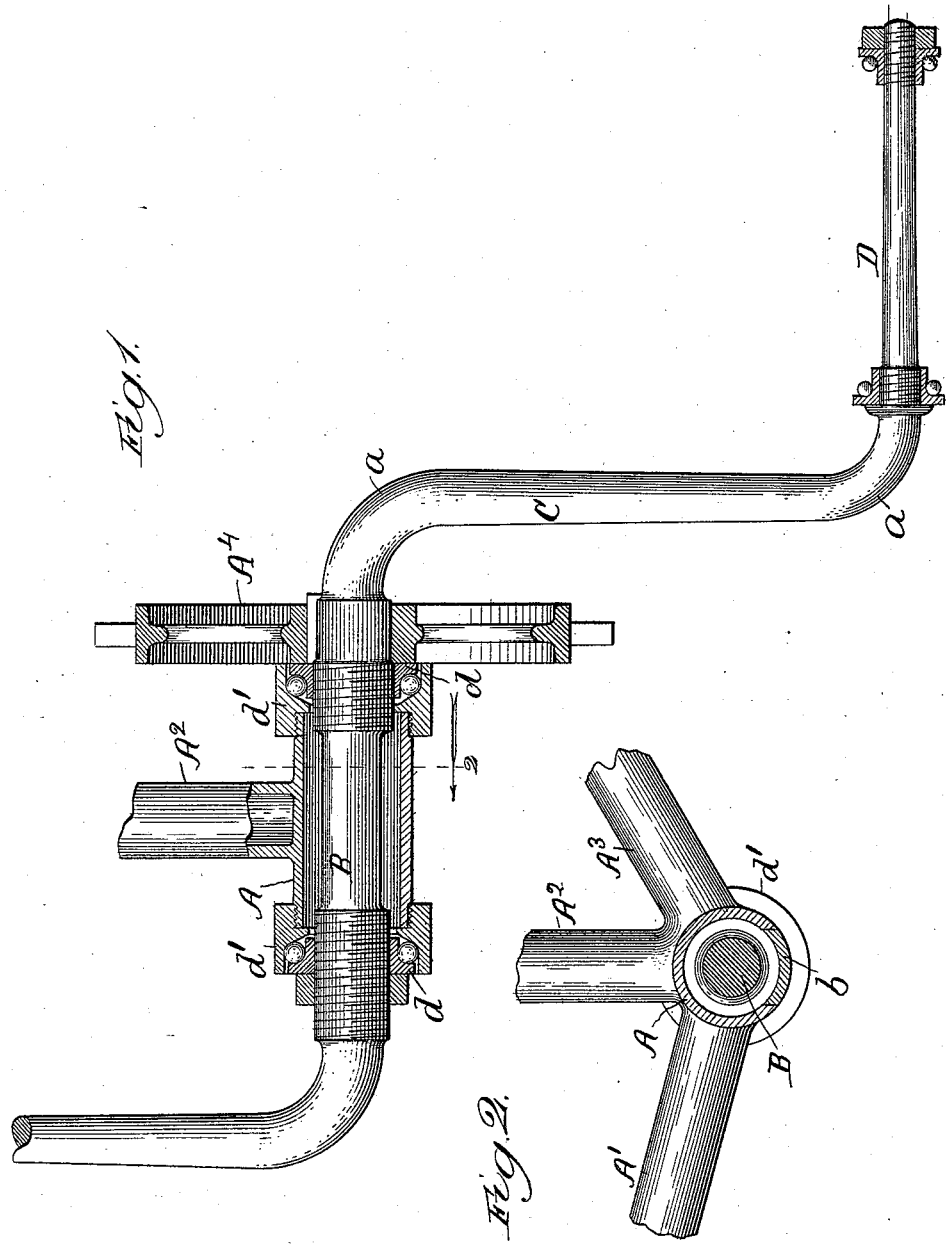
Witnesses:
Chas. E. Gaylord.
Clifford N. White.
Inventor:
Wm. H. Fauber.
By L. B. Coupland & Co.
Attys.

UNITED STATES PATENT OFFICE.

WILLIAM H. FAUBER, OF CHICAGO, ASSIGNOR OF ONE-HALF TO HENRY W. NORTON, OF WELLINGTON, ILLINOIS.

VELOCIPEDE.

SPECIFICATION forming part of Letters Patent No. 492,959, dated March 7, 1893.

Application filed July 18, 1892. Serial No. 440,382. (No model.)

*To all whom it may concern:*

Be it known that I, WILLIAM H. FAUBER, a citizen of the United States, residing at Chicago, in the county of Cook and State of Illinois, have invented certain new and useful Improvements in Velocipedes, of which the following is a full, clear, and exact description, that will enable others to make and use the same, reference being had to the accompanying drawings, forming a part of this specification.

This invention relates to improvements in velocipedes or bicycles and more especially to the crank or pedal shafts of such machines and means for mounting them on the frames thereof.

The invention consists in the matters hereinafter described and pointed out in the appended claims.

In that class of velocipedes or bicycles wherein the crank shaft is mounted in a supporting sleeve provided with anti-friction roller bearings, the two annular parts or rings constituting the main parts of the bearings have commonly been attached one to an end of the sleeve and the other to the crank shaft, so that in order to detach the crank shaft from the frame it becomes necessary to remove the crank arms from the shaft and remove the latter endwise through that part of the bearing which is attached to the machine frame. This prior construction has the obvious disadvantage of making it necessary to make the crank-arms in all cases detachable from the shaft and of requiring the detachment of the crank arms from the shaft whenever it is desired to remove the shaft for the purpose of repairing the machine of parts thereof.

In a construction embodying my improvement the stationary annular parts or members of the anti-friction bearings have detachable connection with the tubular part or sleeve attached to the frame, and the said sleeve is provided with a longitudinal slot or opening of sufficient width to allow the insertion and removal through it of the crank shaft, whereby the crank shaft may be removed from the frame by disconnecting the stationary members of the bearings from the ends of said sleeve or sleeves and then shifting the shaft sidewise or downward from engagement with the sleeve.

As a further improvement I construct the crank arms in one piece with the crank shaft and make said arms throughout their entire length of less diameter than the openings in both annular parts or members of the bearing, so that after the stationary part or member of the bearing has been disconnected from the said sleeve and the movable member of the shaft both parts may be entirely removed from the shaft by slipping them endwise over the crank arm. Important advantages gained by making the crank arms integral with the crank shaft are that in this construction the cranks cannot work loose on the shaft after continuous usage and hand wear on the machine; the cranks and shaft can be removed from the machine without hammering and consequent liability of injury to the same or other parts of the machine; the liability of the joints connecting the crank arms to the shaft as the result of removing and replacing the crank arms is avoided, and the crank shaft thus made while having ample strength is much lighter and more neat in appearance and may be more cheaply constructed than when the crank arms are detachable from the shaft.

The invention may be more readily understood from the following description of one form of construction embodying the same as shown in the accompanying drawings wherein Figure 1 is a view showing the crank shaft of a bicycle in side elevation with the bearings and adjacent parts of the machine in central vertical section. Fig. 2 is a sectional elevation taken on line 2—2 of Fig. 1.

The construction illustrated in this instance as embodying my invention is that adapted to a "rear driving safety" bicycle or one wherein the crank shaft is mounted in the frame and gives motion to the rear wheel of the bicycle by means of sprocket wheels and a chain belt.

In said drawings A indicates a transverse sleeve or tube which is secured in the usual manner to the frame, the parts or members of which are indicated by A' A² A³. The sleeve is herein shown as made integral with the parts of the frame. Said sleeve is arranged generally in the same manner as are the similar sleeves heretofore used in this class of bicycles to afford support for the crank shaft which passes through the same, the sleeve in this instance however differing from those heretofore used in having an opening at one side through which the axle may be laterally removed and inserted.

B indicates the crank shaft which passes longitudinally through the sleeve A and through the medium of which motion is transmitted to the driving wheel of the machine. Means for giving motion to the said driving wheel are herein shown as consisting of a sprocket gear $A^4$ affixed to said crank shaft at one side of the sleeve A and adapted to receive a chain belt which passes over a similar sprocket wheel on the shaft of the driving wheel. The driving wheel and connecting gearing form, however, no part of the present invention and are not therefore herein illustrated. Said crank shaft B is provided at each end with crank arms C to the outer ends of which are attached pedal shafts D D. The crank arms C C are made integral with the shaft B and the pedal shafts D D are similarly made integral with the crank arms, these parts as shown being connected with each other by curved or circular bends $a\ a$ affording smooth or rounded surfaces at the points of connection between said parts.

Anti-friction roller bearings for the shaft consist, as shown, of rings $d\ d$ removably secured to the shaft, and other rings $d'\ d'$ attached to the ends of the sleeve A, said rings $d\ d'$ being provided with opposing annular surfaces between which are placed a plurality of balls or rollers, as common in anti-friction bearings. The rings $d\ d$ of said anti-friction bearings are shown as secured to the shaft B by means of interior screw-threads on the ring engaging corresponding screw-threads formed on the shaft. The parts of the shaft over which the rings $d\ d$ fit are made larger than the parts of the shaft outside of the same, so that said rings when disconnected from the screw-threads may be removed by slipping or passing them over the outer ends of the shaft and the crank arms attached thereto. Such enlargement of the shaft also makes the same stronger and more rigid at its screw-threaded parts. The stationary members or rings $d'$ of the bearings are secured to the sleeve A by means of a screw-threaded connection, herein shown as formed by means of external screw-threads on the sleeve engaging interior screw-threads on the said rings. The sprocket wheel $A^2$ is shown as secured by means of a key to the shaft at a point outside of and adjacent to the bearing at one end of the sleeve, and a jam-nut $d^2$ is shown as applied to the movable threaded part of the shaft so as to bear against the ring $d$ of the bearing at the opposite end of the sleeve to hold the same in place when adjusted to its proper position.

As hereinbefore stated, the sleeve A is provided with a lateral opening wider than the shaft B to allow the insertion and removal of the latter. In order to prevent access of dust and dirt to the parts I prefer to employ a segmental curved plate $b$ adapted to fill the opening in the sleeve and to complete the cylindrical form thereof, the ends of said inserted piece $b$ being screw-threaded in continuation of the screw-threads on the sleeve itself, as clearly seen in Fig. 1, so that when the filling piece is inserted in place and the rings $d'\ d'$ of the bearings screwed upon the ends of the sleeve said filling piece is held firmly in place. The employment of said filling piece while not essential to the carrying out of the main features of my invention may in many instances be found advantageous and a construction including such filling piece is therefore herein claimed as a separate part of my invention.

In assembling the parts of a bearing made as above described the two annular parts or rings $d\ d'$ constituting each bearing are slipped over the ends of the shaft and the shaft is then inserted sidewise through the opening in the sleeve A after which the rings $d'\ d'$ are connected with the ends of the sleeve and the rings $d\ d$ then brought in proper relation to the stationary rings $d'\ d'$ and secured in place. In case it is necessary to remove the shaft in repairing the machine or for other purposes, it is only necessary to shift the rings $d\ d$ outwardly away from the rings $d'\ d'$ and then disconnect the rings $d'\ d'$ from the ends of the sleeve when the shaft can be removed laterally from within the sleeve and will thereby be entirely detached from the frame. Said shaft can therefore be detached from the frame without the removal of the crank arms so that in case a construction is used wherein the crank arms are made separate from and attached to the ends of the crank shaft said arms may be left attached to the shaft during the removal and replacing of the shaft, unless their detachment is required for some special purpose. The employment, when the crank arms are made in separate pieces from the shaft, of the construction described, by which the shaft may be removed from the frame without taking off the crank-arms, is of great advantage for the reason that the removal and subsequent attachment of the crank-arms is an undertaking requiring considerable time and trouble.

In the construction illustrated and above described all parts of the crank shaft and crank arms exterior to the anti-friction bearings are made smaller than the parts of the shaft adjacent to the bearings and the parts at the junction of the crank arms with the shaft are so rounded or otherwise shaped that the annular members or rings constituting the bearings may be removed over the crank arms. This feature of construction, in connection with the supporting sleeve provided with a lateral opening in the manner described, constitutes an important and valuable part of my invention for the reason that it enables the crank shaft and crank arms to be made in one piece and thereby affords the necessary strength in the connection between the crank arms and shaft while enabling these parts to be much more cheaply constructed and giving them a neater and better finish or appearance.

As a still further and a separate improvement I make the pedal shaft continuous or in one piece with the crank arms and make the connection between these parts in the same manner as that between the crank shaft and crank arms, to wit, of less size than the openings of the annular parts or rings constituting the bearings, and so shaped as to allow the said rings to be easily slipped or passed over the same. The obvious advantage of the construction last described is that it enables the shaft, crank arms and pedal shafts to be made of one piece of metal, thereby obtaining the requisite strength in a light, compact and neat structure.

In connection with the shaft and crank arms made in one piece, in the manner described, I make the central opening of the sprocket wheel $A^4$ larger in diameter than any part of the shaft or crank arm exterior to the same, so that the wheel may be easily slipped over the crank arm in assembling the parts or in removing the wheel for renewal or repairs.

It is obvious that the features of construction herein described comprising an open or slotted tube or sleeve, having screw-threaded or clamp engagement with the stationary member of an anti-friction roller bearing, may be employed as well as in connection with each fork of the supporting frame of that class of bicycles in which the crank shaft forms the axle of the driving wheel, as to velocipedes or bicycles having crank shafts made separate from the driving wheel such as is herein illustrated.

The general features of construction herein described may obviously be employed in connection with an "ordinary" machine of that class known as a geared ordinary or one where the crank shaft is separate from the driving wheel and is connected with the same by gearing.

I claim as my invention—

1. The combination with a machine frame and crank-shaft, of a transverse supporting sleeve attached to the frame and provided with a lateral opening for the insertion and removal of the shaft, and bearings for the shaft located at opposite ends of said sleeve, each of said bearings comprising a stationary annular part which is separately and detachably secured to one of the sleeve-ends, substantially as described.

2. The combination with a machine frame, of a transverse supporting sleeve attached to the frame, a crank shaft and crank arms made in one piece or integral with each other, said supporting sleeve being provided with a lateral opening to allow the insertion and removal of the shaft, and a bearing for the shaft comprising an annular part which is adjustable endwise relatively to the shaft and is secured to the said sleeve or tube by a screw joint, substantially as described.

3. The combination with a machine frame and crank shaft, of a transverse supporting sleeve attached to the frame and provided with a lateral opening for the insertion and removal of the shaft, and an anti-friction roller bearing for the shaft of which the stationary annular part or member is secured to the end of the sleeve, substantially as described.

4. The combination with a machine frame and crank shaft, of a transverse supporting sleeve attached to the frame and provided with a lateral opening for the insertion and removal of the shaft, and an anti-friction roller bearing for the shaft of which the stationary annular part or member is secured to the end of the sleeve by means of a screw-threaded joint, substantially as described.

5. The combination with a machine frame and crank-shaft, of a supporting sleeve attached to the frame and provided with a lateral opening for the insertion and removal of the shaft, and anti-friction roller bearings, of which the stationary members have screw-threaded connection with the ends of the sleeve and the movable members are attached to and have longitudinal adjustment upon the shaft, substantially as described.

6. The combination with a machine frame and crank shaft, of a supporting sleeve attached to the frame and provided with a lateral opening for the insertion and removal of the shaft, anti-friction roller bearings, of which the stationary members have screw-threaded connection with the ends of the sleeve and the movable members are attached to and have longitudinal adjustment upon the shaft, and a segmental filling piece also provided with screw-threads at its ends to engage said stationary parts or members of the bearings, substantially as described.

7. The combination with a machine frame, of a crank-shaft and crank-arm made integral with each other, and a bearing for the shaft comprising an annular part or member surrounding the shaft, those parts of the shaft and crank-arm exterior to the bearing being made in all parts smaller in size than the diameter of the shaft at the point where the said annular part or member of the bearing engages the same, whereby the latter may be removed over the crank-arm, substantially as described.

8. The combination with a machine frame, of a crank shaft and crank arms made integral with each other, a transverse supporting sleeve attached to the frame and provided with a lateral opening for the insertion and removal of the shaft and anti-friction roller bearings of which the stationary annular parts or members are attached to the ends of the said sleeve, those parts of the shaft and crank arms exterior to the bearings being made in all parts smaller in size than the diameter of the central openings of the annular parts or members of the bearing, whereby the latter may be removed over the crank arms, substantially as described.

9. The combination with a machine frame, of a crank shaft, crank arms and pedal shafts made integral with each other, a supporting sleeve for the crank shaft attached to the frame and provided with a lateral opening for the insertion and removal of the crank shaft, and anti-friction roller bearings for the shaft of which the stationary annular parts are attached to the ends of said sleeve, the parts of said crank arms and pedal shafts exterior to the bearings being made of less diameter than the inner diameter of the annular parts or bearings whereby the latter may be removed endwise from the shaft, substantially as described.

10. The combination with a machine frame, of a crank shaft, crank arms and pedal shafts made integral with each other, a supporting sleeve for the crank shaft attached to the frame and provided with a lateral opening for the insertion and removal of the crank shaft, and anti-friction roller bearings for the shaft of which the stationary annular parts are attached to the ends of said sleeve, the said crank arms and pedal shafts being made of less diameter than the inner diameter of the annular parts or bearings whereby the latter may be removed endwise from the shaft, and a sprocket wheel attached to the shaft the central opening of which is greater in diameter than the parts of the shaft and crank arms exterior thereto, substantially as described.

WILLIAM H. FAUBER.

Witnesses:
L. M. FREEMAN,
L. B. COUPLAND.